A. D. ELSTER.
FISHING FLOAT.
APPLICATION FILED MAR. 18, 1916.
1,216,220. Patented Feb. 13, 1917.
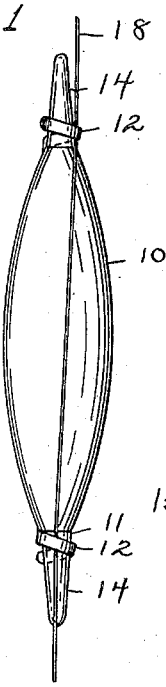
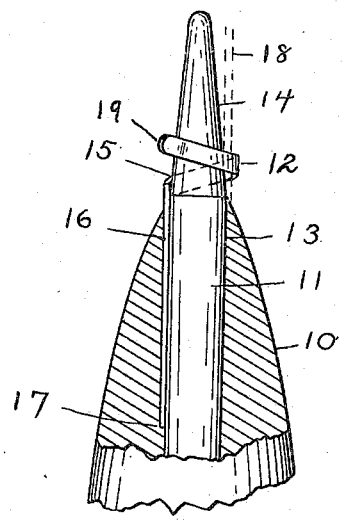
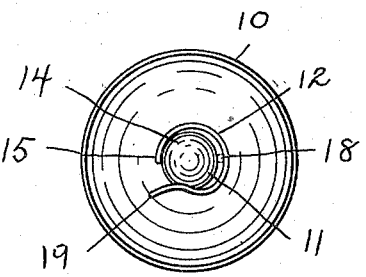
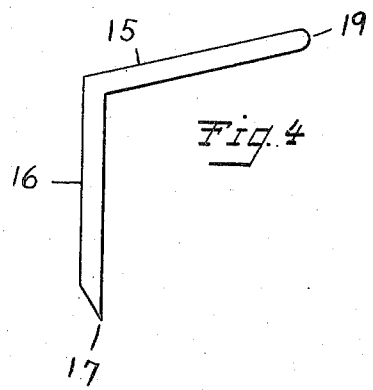
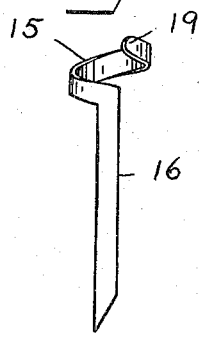
Inventor:
Albert Daniel Elster.
By Louis M. Schmidt
Atty.

UNITED STATES PATENT OFFICE.

ALBERT DANIEL ELSTER, OF MERIDEN, CONNECTICUT.

FISHING-FLOAT.

1,216,220.　　　Specification of Letters Patent.　　Patented Feb. 13, 1917.

Application filed March 18, 1916. Serial No. 85,019.

*To all whom it may concern:*

Be it known that I, ALBERT DANIEL ELSTER, a citizen of the United States, residing at Meriden, in the county of New Haven and State of Connecticut, have invented a new and useful Improvement in Fishing-Floats, of which the following is a specification.

My invention relates to improvements in fishing floats, and the object of my improvement is simplicity and economy in construction and convenience and efficiency in use, having relation to means for fastening the line to the float, whereby the line may be readily changed for a change in the style of fishing, and without the use of removable parts, such as are sometimes used, and which when removed are liable to become mislaid and lost.

In the accompanying drawing:—

Figure 1 is a side elevation of a fishing float, embodying my invention, and part of the line.

Fig. 2 is a similar view, on an enlarged scale, of the upper part of the same, the cork body being in part broken away.

Fig. 3 is a plan view of the same.

Fig. 4 is a plan view of the blank for the line clip.

Fig. 5 is a perspective view of the line clip.

My improved fishing float comprises a float proper of ordinary structural form, composed of a cork body 10 and a core 11 of wood, to each end of which is applied a line clip 12 of special construction.

The said float proper or body structure as shown is a symmetrical structure relatively to the longitudinal axis and also has both ends alike, and the two clips 12, applied one to each end, are alike.

The cork body 10 is of elongated, elliptical form for the exterior surface and has a longitudinal bore 13 in which is positioned the wooden core 11. The said wooden core 11 is a snug fit for the bore 13, so as to fill the same and the ends 14 extend beyond the cork body 10 as usual, the said ends 14 being generally tapered, as shown.

The clip 12 is made of sheet material and comprises a generally circular body portion or main portion 15 at the outer end portion and an elongated stem or prong 16 extending from one end of the said main portion 15.

The ends 14 of the wooden core 11 extending beyond the ends of the cork body 10 serve as stems for the float.

The main portion 15 of the clip 12 in each case encircles the said stem 14 in the form of a collar, adjacent the opposed end of the cork body 10, and is a good fit for the same. The prong 16 is of appreciable length, extends in the longitudinal direction, and is forced into position between the wooden core 11 and the cork body 10, as shown, suitably to serve as a support for the collar 15.

The tip end 17 of the prong 16 may be tapered as shown to facilitate the insertion of the said prong 16 into position as described.

The collar 15 serves as a spring member, the line 18 being forced between the same and the stem 14 and held in place by the resiliency of the material of the said collar 15.

The tip end 19 of the free end portion of the collar 15 is turned outwardly as shown suitably to serve as a guide wing to facilitate the insertion of the line 18 into position between the collar 15 and the stem 14.

As mentioned, two clips 12 are used, one at each end of the float structure, the line 18 being in each case slipped between the collar 15 and the stem 14 and the intermediate portion of the line lying along the outside of the cork body 10.

As described, the prong 16 serves as the support for the collar portion 15 of the clip, and the same also serves to bind the cork body 10 to the wooden core 11.

Clips 12 such as described may be provided separate, suitable to be applied to float structures of the type shown or generally similar thereto, or the float structures complete may be supplied with the clips already assembled.

While I have shown the prong 16 connected to one end of the collar 15, the same may be connected to the same at some other position.

As shown, and as is usual in fishing float structures, the wooden core or plug 11 has a circular form of cross-section and is cylindrical in form for the main portion that is positioned in the bore 13 of the cork body 10, and as stated the same is a snug fit for the said bore 13.

The clip 12 as mentioned is made of sheet material, and the stem or prong 16 is of appreciable length and also of substantial width. Furthermore the opposed walls of the core 11 and cork body 10 have a high degree of curvature and the stem 16 is flat, and has the sharp point 17.

Therefore, in forcing the stem 16 into position in the bore 13, between the cork body 10 and the core 11, the point 17 at the tip end serves to force the walls of the bore 13 away from the core 11, the cork body 10 yielding on account of the resiliency of the material of which the cork body 10 is composed. When finally in position the stem 16 is firmly held by the pressure exerted by the material of the cork body. Because of the curved form of the holding surfaces and the flat form of the stem 16, the stem is subjected to a tendency to a change in shape to conform to that of the said surfaces, involving a binding strain, and which is resisted on account of the resiliency of the material of the said stem 16, and which tends to increase the holding effect on the stem.

Because the stem 16 is flat and of moderate thickness, there is no undue strain on the material of the cork body as it is forced away from the core 11, and whatever holding pressure is exerted on the stem 16 is well distributed, so that there is a minimum of danger of breaking the cork body 10 as the stem 16 is forced into place.

I claim as my invention:—

A fishing float comprising a float structure composed of a cork body having a longitudinal bore of circular cross-section, a core having a body portion fitting in and positioned in the said bore, and end portions projecting beyond the said cork body, and a line clip, the said clip being formed of sheet material and comprising a collar fitting around the said end portion of the core, and a supporting stem for extending longitudinally in the said bore between the said cork body and core, the said stem being of appreciable length and substantial width, and having a sharp point at the tip end, whereby the said stem is suitable to be entered into holding position by forcing material of the said cork body away from the said core.

ALBERT DANIEL ELSTER.

Witnesses:
L. C. PARDEE,
STANLEY PARDEE.